Patented Jan. 3, 1928.

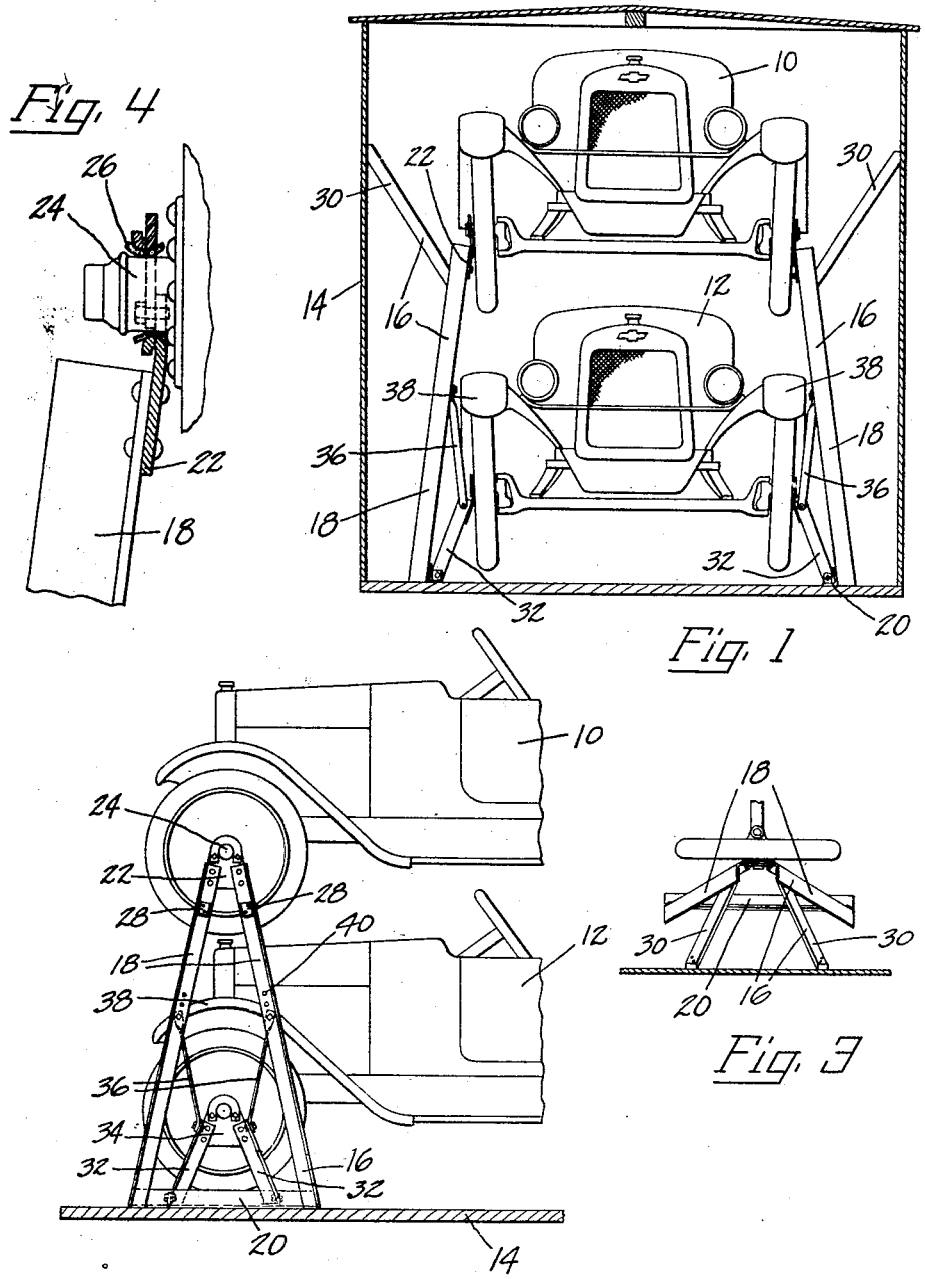

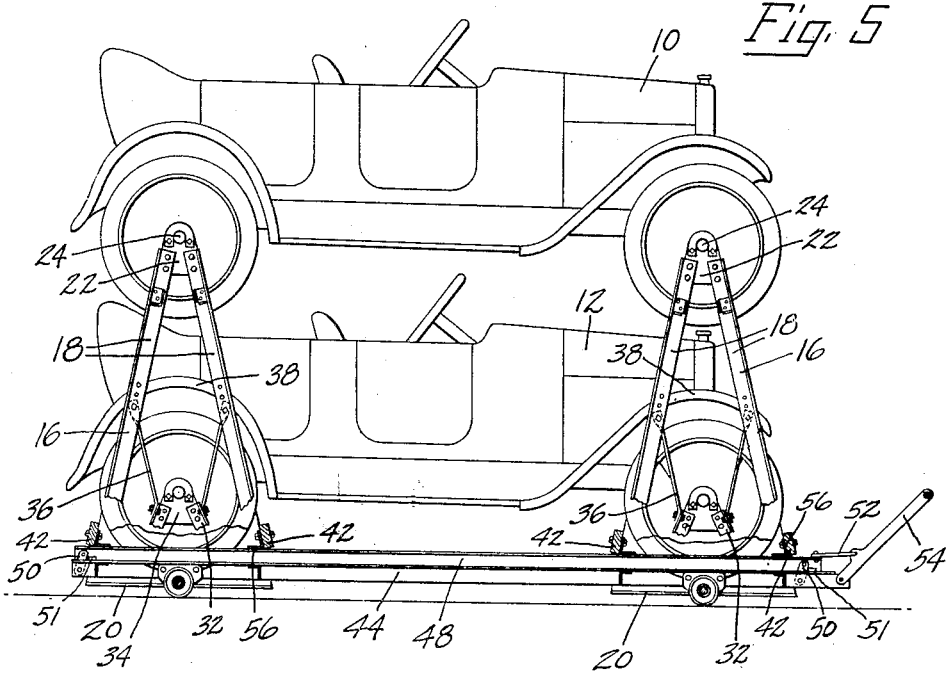
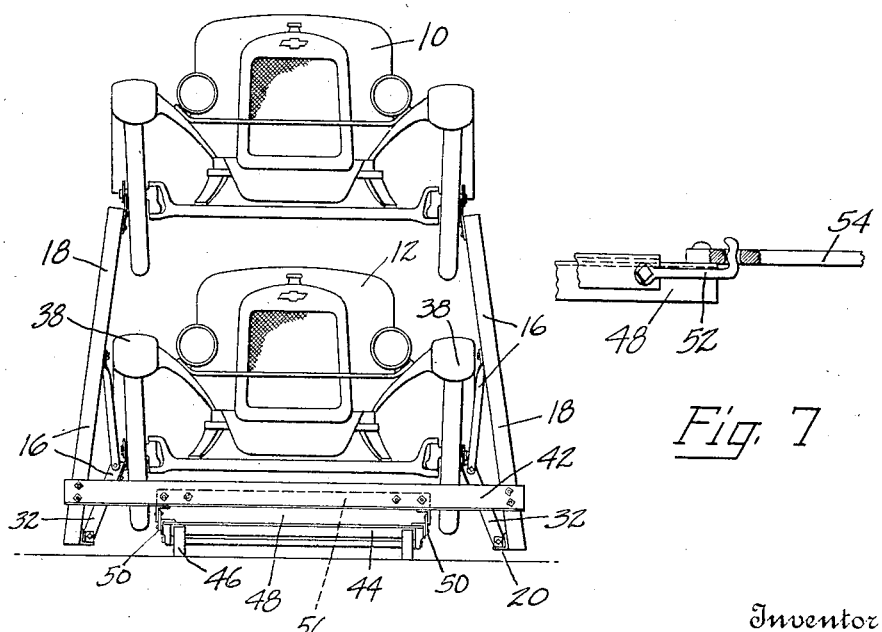

1,655,150

UNITED STATES PATENT OFFICE.

CHARLES L. LEE, OF DAYTON, OHIO, ASSIGNOR TO GENERAL MOTORS CORPORATION, OF DETROIT, MICHIGAN, A CORPORATION OF DELAWARE.

SHIPPING AUTOMOBILES.

Application filed May 5, 1924. Serial No. 711,077.

This invention relates to the shipment of automobiles, and is illustrated as applied in "decking" automobiles,—i. e. shipping them in upper and lower tiers to enable the shipment of enough automobiles in one car to bring the total weight above the minimum carload weight.

An important object of the invention is to support both upper and lower automobiles on the same bracing and supporting frames or "decks", thus permitting their loading by a novel method according to which the automobiles and their decks are assembled on the loading platform, and are afterwards moved into the freight car and braced and secured in place. Thus the automobiles may be decked in advance, on the loading platform or "dock" where there is plenty of room to work, and when cars are received they can be loaded and shunted back out in a minimum of time. This is a substantial advantage in decking and shipping hundreds of automobiles a day, where delay in getting the cars away from the loading dock may have serious results in congesting the loading space.

In one desirable arrangement, the decks are in the form of main frames engaging and supporting the hubs of the upper automobile, and inclined or otherwise arranged to clear the side fenders of the lower automobile, the lower one being supported by auxiliary frames projecting under the side fenders to engage the hubs of the lower automobile. Preferably each auxiliary frame is foldable substantially into the plane of its main frame, for return shipment.

The above and other objects and features of the invention, including various novel combinations and desirable particular constructions, will be apparent from the following description of the illustrative apparatus shown in the accompanying drawings, in which:

Figure 1 is a front elevation of upper and lower automobiles decked in a boxcar, the boxcar being shown in vertical section;

Figure 2 is a side elevation of the automobiles shown in Figure 1, with the upper braces removed;

Figure 3 is a top plan view of one of the decks in place, and of the corresponding wheel of the automobile;

Figure 4 is a detail sectional view, showing the manner of supporting one of the hubs;

Figure 5 is a side elevation, partly broken away, of a pair of decked automobiles on a truck on the loading platform;

Figure 6 is a front elevation of the decked automobiles and the truck; and

Figure 7 is a detail view of a part of the hoisting mechanism of the truck.

As shown in Figures 1–4, when loaded, upper and lower automobiles 10 and 12 are supported in a boxcar 14 by a plurality of decks 16. Each deck is shown as comprising downwardly-diverging legs 18 of angle iron, connected at the bottom by a base angle iron 20, and connected at the top by a plate 22 having an opening to embrace one hub 24 of the upper automobile 10. The hub may be protected by burlap or similar material 26 (Figure 4). Each leg is formed with a socket or bracket 28, shown as being used with a side brace 30 of wood, intended to be used once and discarded. The two braces 30 diverge upwardly and outwardly to the side wall of the boxcar 14.

The lower automobile is supported on auxiliary frames carried by the main frames 16, and each comprising legs 32 pivotally bolted to lugs on the base 20 and connected by a plate 34 having an opening to embrace one hub of the automobile 12. Braces 36 are bolted at their lower ends to the legs 32, and at their upper ends to legs 18. The auxiliary frame, as appears in Figure 1, projects forwardly under the side fender 38 of the lower automobile, the main frame being inclined just enough to clear the fender. In returning the decks after use, the auxiliary frame is folded substantially into the plane of the legs 18, by removing the bolts connecting the braces 36 and the legs 18, and replacing them in holes 40 (Figure 2), a little further up.

In loading automobiles with the above-described decks, as shown in Figures 5, 6, and 7, the decks and automobiles are assembled on the loading platform, where there is plenty of room to work, and plenty of room to use mechanical hoists and other equipment which it is difficult to use in the cramped space inside of a boxcar. Preferably suitable temporary braces, such as the crossbars 42, are used to hold the assembly rigid until it is secured and braced inside of the car, there being any desired number of such temporary braces at any points considered desirable. These braces are removed after the bases 20 are secured to the floor of the car and the braces 30 are in place.

The assembly made up as described is moved into the car by any suitable truck or the equivalent. The one shown comprises a base frame 44 on small wheels or rollers 46, on which is supported a hoisting frame 48 carried by four or more swinging parallel links 50. When the links are swung to the left (Figure 5) the hoisting frame 48 is in its lower idle position resting on the base frame 44. In this position the truck can be run below the lower automobile 12, between the wheels, and under the temporary braces 42. A hook 52 on the hoisting frame 48 is now engaged with an opening in the handle or drawbar 54 of the truck, and by rocking the drawbar downwardly, the hoisting frame is swung upwardly on its links 50, until it engages the temporary braces 42 and lifts the two automobiles and their decks clear of the floor of the loading dock. When the links 50 swing past dead center, they engage fixed stops 51, so that the weight of the automobiles and decks holds frame 48 in its upper position. The hook 52 may now be disengaged and the truck moved into the boxcar. In the arrangement shown in the drawings, the hoisting frame 48 carries angle irons 56 which engage the flat faces of the temporary braces 42, and which may be temporarily (or permanently) bolted thereto.

While a particular form of apparatus has been described in detail, and one manner of using it has been fully explained, it is not my intention to limit the scope of the invention by such description and explanation, or otherwise than by the terms of the appended claims.

I claim:

1. An automobile-supporting deck comprising, in combination, inwardly inclined frames for opposite sides of an automobile arranged to support the automobile from the floor of a freight car by engagement with the wheel hubs and at a substantial height above the floor, means for bracing the frames, and means for supporting a second automobile on the same frames by engagement with the wheel hubs below the first automobile.

2. An automobile-supporting deck comprising, in combination, rigid frames engaging under the hubs of an upper automobile on opposite sides to support it from the floor and inclined inwardly to clear the side fenders of a lower automobile, and means carried by the same frames for engaging and supporting the hubs of the lower automobile.

3. An automobile-supporting deck comprising, in combination, main frames arranged to support opposite sides of an upper automobile and inclined to clear the side fenders of a lower automobile, and auxiliary frames carried by the main frame and projecting inward below the side fenders to engage and support the hubs of the lower automobile.

4. An automobile-supporting deck comprising, in combination, main frames arranged to support opposite sides of an upper automobile and inclined to clear the side fenders of a lower automobile, and auxiliary frames carried by the main frame and projecting inward below the side fenders to engage and support the hubs of the lower automobile, the auxiliary frames being foldable into the planes of the main frames for return shipment.

5. An automobile-supporting deck comprising, in combination, main frames arranged to support opposite sides of an upper automobile and inclined to clear the side fenders of a lower automobile, and auxiliary frames carried by the main frames and projecting inward below the side fenders to engage and support the hubs of the lower automobile, each main frame being formed with sockets near its top, together with straight braces received at their inner ends in the sockets and diverging therefrom.

6. That method of loading decked automobiles in boxcars which comprises the steps of decking an upper and a lower automobile by securing them on supporting frames on the loading platform, outside of the boxcar, then moving the assembled upper and lower automobiles and their frames into place in the boxcar, and then bracing and securing the frames for shipment.

7. The combination of a pair of upright supporting devices having their lower ends secured against bodily sidewise movement, means for supporting an automobile between the upper ends of said devices, and means for supporting an automobile between the lower ends of said devices so that the weight of the last named automobile is effective to draw the upper ends of said devices into holding engagement with the first named automobile.

8. In the combination as defined by claim 7, means for bracing the upper ends of said devices to assist in preventing their separation.

In testimony whereof I affix my signature.

CHARLES L. LEE.